United States Patent [19]

Hancovsky

[11] Patent Number: 4,659,127
[45] Date of Patent: Apr. 21, 1987

[54] HOLE CLEANING DEVICE
[75] Inventor: John P. Hancovsky, McMurray, Pa.
[73] Assignee: Matthews International Corporation, Pittsburgh, Pa.
[21] Appl. No.: 834,398
[22] Filed: Feb. 28, 1986
[51] Int. Cl.⁴ .......................... A01G 3/06; B26B 3/04
[52] U.S. Cl. ................................................... 294/50.7
[58] Field of Search ............... 294/50.7, 19.1, 50.6, 294/50.8, 50.9, 34; 30/301, 302, 316, 300; 15/104.05, 104.1 C; 172/13, 18, 19, 21, 111

[56] References Cited

U.S. PATENT DOCUMENTS

| | | |
|---|---|---|
| 1,013,823 | 1/1912 | Sheldon . |
| 2,855,668 | 10/1958 | Ottenad et al. . |
| 3,080,006 | 3/1963 | Brolin . |
| 3,093,198 | 6/1963 | Webber . |
| 3,131,777 | 5/1964 | Snider . |
| 3,382,935 | 5/1968 | Watts . |
| 3,662,844 | 5/1972 | Baker . |
| 3,718,358 | 2/1973 | Ayers ................................ 294/50.7 |
| 3,847,227 | 11/1974 | Myers ................................ 294/50.7 |
| 4,209,903 | 7/1980 | Owens ................................ 294/50.7 |
| 4,488,605 | 12/1984 | Ruppel et al. . |
| 4,539,750 | 9/1985 | Jarvi et al. . |

Primary Examiner—James B. Marbert
Attorney, Agent, or Firm—Parmelee, Miller, Welsh & Kratz

[57] ABSTRACT

A rotatable hand tool for cleaning soil, stones, grass cuttings and like accumulated debris from a blind hole such as a memorial vase hole. The device comprises a cylindrical head portion having a transverse plate member fitted therein in spaced relation to a terminal end thereof. The plate member has a cutout section and carries a downwardly depending cutting edge along one side of the cutout and an upwardly curved section along the opposed side. A shaft with a transverse handle is affixed to the head portion to permit rotation of the head and cutting edge about a longitudinal axis of the device. A vertical barrier plate is affixed within the head member adjacent to the cutout section to prevent accumulated material dislodged by the cutting edge and entrained within the device from escaping from a storage reservoir defined by the sidewalls and plate member.

16 Claims, 4 Drawing Figures

HOLE CLEANING DEVICE

BACKGROUND OF THE INVENTION

My invention relates generally to rotary hand tools and, more particularly, to devices which are useful in removing accumulated soil, stone and other debris from difficult to clean blind holes, such as, for example, memorial vase holes of the type found in cemeteries.

In a commonly used memorial marker system, a decorative bronze memorial plate is laid at the burial site. The memorial plate usually carries the name or names of the decedents along with their dates of birth and death and possibly other indica such as an epitaph or the like. In addition, a commonly used memorial plate of this type may contain one or more apertures for the insertion and display of a permanent bronze memorial vase thereon. When in use, the vase is locked at its base portion by several outwardly flaring tabs which matingly engage tabs and recesses carried by the aperture of the memorial plate. In this manner, the memorial vase is not likely to be overturned by strong winds and appears as a permanent fixture with respect to the memorial plate. When the vase is not in use, as in the winter months, it is rotated and unlocked from the aperture of the memorial plate, turned upside down and reinserted through the aperture in an inverted position. The inverted vase is then rotated and re-locked within the plate aperture such that the base of the vase is substantially flush with the exposed surface of the memorial plate, while its inverted top is about one foot beneath the plate. When the vase is properly stored, there are no significant protrusions above the upper surface of the memorial plate, which permits the operation of lawn movers over the plate surface, including the area occupied by the inverted vase. In order to provide a space for storing the inverted vase, memorial plates of this type are preferably fitted with a canister beneath each of the apertures. The plastic canister is cylindrical in shape and is secured to the underside of the memorial plate, extending downwardly into the earth about one foot in order to accommodate the length of the inverted vase therein. The vase canister carries a mounting flange around its upper periphery for attachment to the memorial plate and also is provided with plurality of radially extending, raised ribs formed on the floor to prevent tight nesting of the canisters during shipment. The vase canister is intended to act as an earth barrier to maintain an open hole so as to allow for trouble-free insertion of the inverted vase without the necessity of reforming a hole in the earth each time the vase is to be stored. Unfortunately, in practice, such trouble-free insertion is not always the case. It has been observed that soil, stones, grass cuttings and like debris accumulates at the bottom of the vase canister over a period of time. Rainwater tends to carry such materials into the canister and, while the water will eventually pass through a drain hole provided in the floor of the canister, the above-mentioned solid materials collect and remain lodged at the bottom region of the canister. If not removed, the accumulated layer of deposited material prevents the vase from properly seating within the canister. As a result, the bottom of the vase will then protrude above the surface of the memorial plate, resulting in a poor appearance with possible breakage of the bronze vase and possible damage to the grass cutting equipment. It has been found that dislodgment and removal of accumulated silt, stones and other debris from the vase canister holes is difficult due to the relatively small size of the circular opening of the aperture in the memorial plate coupled with the depth of the canister hole. The aperture diameter is about 4 inches and the depth of the canister is about 12 inches. Naturally, maintenance workers are reluctant to place their hands near or into blind, subterranean holes, particularly in areas where poisonous snakes, spiders, scorpions or like creatures may find habitat. Cleaning these canister holes has, thus, proven to be a somewhat difficult and sometimes hazardous task. In addition, spillage of the removed material from a small shovel or from some other makeshift tool often occurs when they are extracted from the hole which naturally soils the decorative memorial plate surface and requires additional maintenance time to effect removal therefrom.

My invention solves many of the problems heretofore encountered in cleaning vase canister holes and like blind holes by providing a relatively simple, yet effective, hand-manipulated device which rotatably loosens and collects the material lodged within the hole for fast and easy removal therefrom. The hole cleaner of the present invention also provides a sharp cutting edge at the bottom thereof which is adapted to be manually rotated for digging and loosening lodged or compacted soil and stone within a blind hole, such as a canister vase hole, while avoiding any interference with the raised ribs or other irregularities which may be found on the floor of the blind hole. Still further, my invention provides a vase hole cleaner which gathers the accumulated debris in an efficient manner and retains such loosened material within a storage reservoir portion to permit quick and tidy removal thereof from the vase hole so as to minimize spillage and the necessity for subsequent cleaning of the decorative surfaces of the memorial plate.

SUMMARY OF THE INVENTION

Briefly, my invention provides a device for cleaning a blind hole such as found in a memorial vase canister and comprises a cylindrically-shaped head portion having a circular bottom plate member affixed therein. The plate member is aligned generally perpendicular to the longitudinal, rotative axis of the cylindrical head and is spaced inwardly from a terminal edge portion of the head portion. The plate member has a pie-shaped, cutout section formed therein with one side of the cutout section bent downwardly from the plane of the plate to form a cutting edge thereon. The cutting edge extends to a plane defined by the terminal edge of the cylindrical head portion. The cutting edge is preferably ground to form a sharp edge and extends radially from the sidewall of the cyindrical head to the central axis thereof. A rod-shaped shaft element carrying handle means is attached to the cylindrical head and bottom plate along the longitudinal axis of the head to permit manual rotation of the device. In use, the terminal edge of the rotating cylindrical head portion forms a bearing plane which is adapted to ride on the raised ribs of the floor when the device reaches its lowermost position within the vase canister. In such a manner, the spaced relation between the plate member and the terminal edge of the cylindrical head serves to keep the cutting edge from striking the raised ribs of the canister floor, thus avoiding interference therebetween. When the device is rotated, the soil, stone, or other debris which is loosened by the rotating cutting edge, passes through the cutout section of the bottom plate. A surface area of the bottom plate adjacent a side of the cutout section opposite the cutting edge is curved upwardly to form an entry passage to permit ingress of loosened material through the cutout section. The dislodged material passes through the cutout section and is confined within a storage reservoir chamber formed by the bottom plate and sidewalls of the cylindrical head portion. A vertical barrier plate is affixed within the cylindrical head at the area of the cutout portion, opposite the cutting edge, to prevent trapped material from spilling from the storage reservoir. After the hole has been cleaned, the device is withdrawn therefrom and the soil and debris trapped within the storage chamber of the cylindrical head is removed simply by inverting the head, permitting the trapped material to spill from the open top thereof.

DETAILED DESCRIPTION OF THE INVENTION

Figure 1:
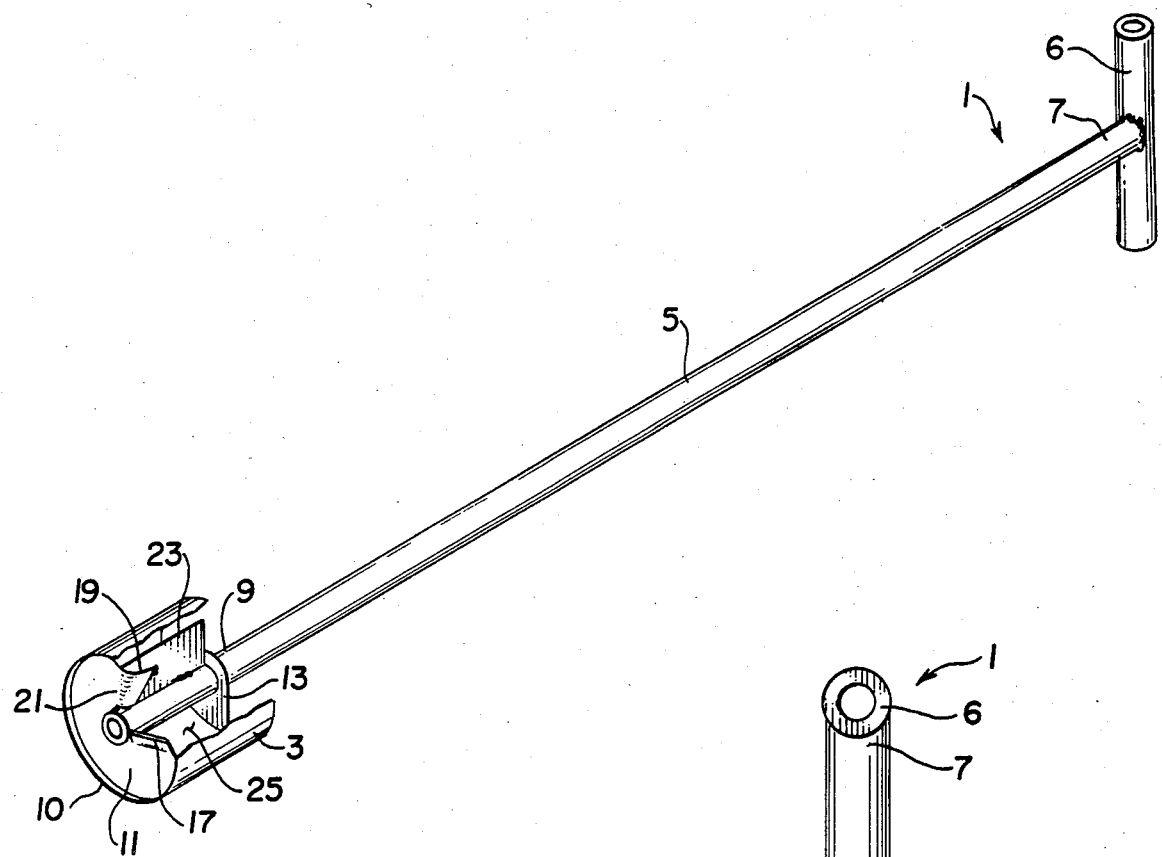
FIG. 1 is a partially cut-away, perspective view of a presently preferred embodiment of the hole cleaning device of the present invention.
Figure 2:
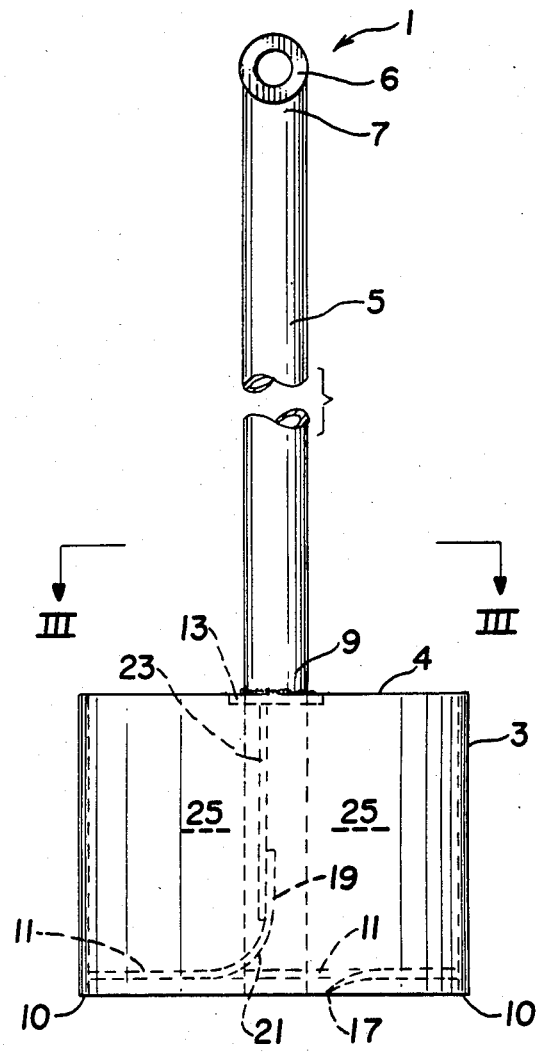
FIG. 2 is a partially frugmented, side elevational view of the device of FIG. 1.
Figure 3:
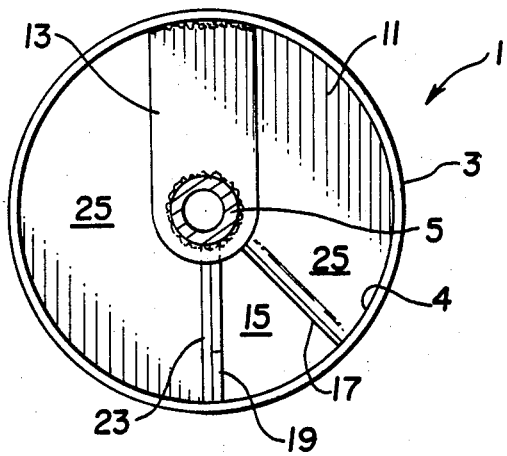
FIG. 3 is a partial sectional, top plan view of the device taken along line III—III of FIG. 2.
Figure 4:
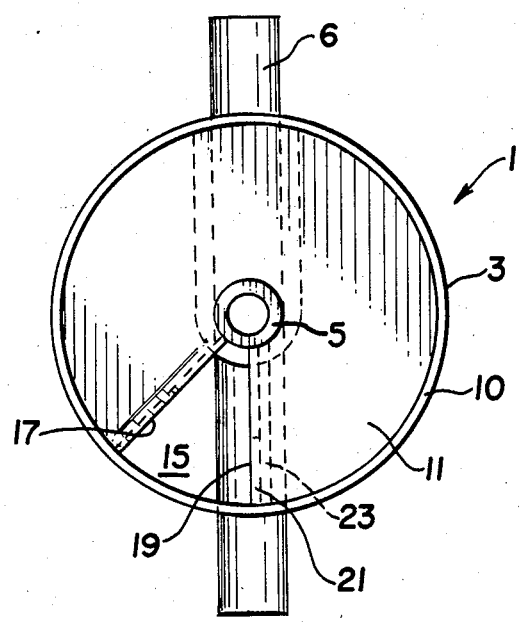
FIG. 4 is a bottom plan view of the device shown in FIGS. 1-3.

The hole cleaning device, generally designated 1 in the drawings, includes a cylindrical head portion 3 which may be conveniently formed from a section of pipe of suitable diameter which is slightly smaller than the diameter of the vase canister hole to be cleaned (not shown). The cylindrical head member 3 has an open interior 25 within its sidewalls and a substantially open top area at upper edge 4 and a lower terminal edge 10. A circular, flat bottom plate member 11 is affixed within the interior of the cylindrical head portion 3 and is spaced inwardly a small distance, for example ⅛ inch, from the lower edge 10 thereof. The plate member 11 has a pie-shaped cutout section 15 formed therethrough which extends from the sidewalls of the cylindrical head 3 to the central axis thereof. The cutout portion preferably occupies an approximate 45° segment of the plate member 11 as seen in FIGS. 3 and 4. In forming the cutout section 15, the plate 11 is preferably cut along the edge 17 and the plate material is then bent upwardly along a vertical plane passing through the line 19. While bending this plate section upwardly, a curved surface area 21 (as seen in FIGS. 1-2) is formed in plate member 11 which provides a tapered entrance region for the soil and debris to more easily enter the interior of the device. The edge 17 which is first cut to permit the formation of the pie-shaped area 15, is bent downwardly to form a cutting edge. The terminal end of the cutting edge 17 does not exceed the plane defined by the lower edge 10 of the cylindrical head so as to prevent interference with the raised ribs of the vase canister when the device 1 is rotated therein. The cutting edge 17 is also filed or ground to form a sharpened surface therealong so as to improve the digging performance of the device. A vertically extending barrier plate 23 is also secured within the cylindrical head portion 3 extending from the sidewall thereof radially inward to the center. Barrier plate 23 is preferably attached to the bent-up section 19 of the bottom plate 11, adjacent the edge of the cutout area 15, opposite the cutting edge 17.

An elongated shaft 5 is secured at its lower end 9 to the cylindrical head member 3 and is aligned along the longitudinal axis of rotation of the head. Attachment between shaft 5 and cylindrical head 3 is made by way of a web element 13 which is welded to the shaft 5 and to the sidewall of the head at the upper portion 4 thereof. Shaft 5 is also preferably welded to the plate 11 and may protrude through the plate member and terminate at the plane defined by the lower edge 10 of the head 3. The upper portion 7 of the shaft 5 is fitted with a transverse bar 6 which forms a convenient T-shaped handle to permit the manual rotation of the device 1 within the vase hole or like blind hole.

It will be noted that the sidewalls of the cylindrical head 3, the plate member 11, and the vertical barrier plate 23 form a storage chamber or reservoir within the interior 25 of the cylindrical head for retaining loosened soil and other material therein. In operation, the device 1 is inserted in a vase canister hole and rotated by the operator who turns the handle 6 in a clockwise direction (for the device depicted in the drawings). The moving cutting edge 17 carried by the plate 11 will diggingly engage the lodged soil, rock, mud or other debris within the hole and tend to force the loosened material upwardly along its sloped surface toward the storage reservoir area 25 of the cylindrical head. Entry of loosened material into storage reservoir 25 is facilitated by the upwardly curved entry section 21 of the bottom plate 11. As perhaps best be seen in FIG. 2, the opposed sides of the cutout section 15, represented by the downwardly sloped cutting edge 17 and the upwardly curved section 21, provide a clear path for entry of the loosened material. Continued rotation of the handle 6, shaft 5, cylindrical head 3 and cutting edge 17 causes the loosened and accumulated material to move around the bottom plate 11 until the material impinges upon the vertically extending barrier plate 23. Barrier plate 23 halts further movement of the material and traps it within the confines of the cylindrical head to prevent spillage from the reservoir 25 into the cutout section 15. The device 1 is rotated until all of the lodged material within the hole has been loosened and trapped within the storage reservoir 25. In its lowermost position within a vase hole, the terminal edge 10 of the head 3 impinges upon the raised radial ribs on the floor of the vase canister (not shown). The spaced relation between the bottom plate member 11 and the terminal edge 10 is important in that it permits the cutting edge 17 to be bent downwardly so as to form an inclined plane surface to facilitate the required digging action. The plane of the terminal edge 10 is at, or slightly beyond, the tip of the cutting edge 17 and bears against the radial ribs of the vase canister and thus serves to space the cutting edge 17 from the irregularities of the floor of the blind hole. In this manner, interference between the cutting edge 17 and the raised ribs in prevented which yields a faster and more thorough cleaning operation. Such spacing also prevents damage to the floor of the vase canister which would otherwise possibly occur if the cutting edge were to contact the ribs. When the storage reservoir 25 is filled with material, the device 1 is withdrawn from the hole of the canister and the contents thereof are removed by simply inverting the device and rapping the head 3 to permit the accumulated material to be dumped through the opening at the top 4 thereof.

The hole cleaning device 1 of the present invention may be formed of a metal, such as steel or aluminum, or of a high strength, impact resistent thermoplastic, depending on the expected severity of service. Likewise, the device could be constructed of a combination of materials, for example, the cutting edge may be metal while the balance of the components are of a plastic material. Dimensionally, the shaft 5 is of a convenient length to permit the operator to insert and rotate the device within a vase hole without undo stooping or bending. It is also beneficial to have a shaft which is longer than the striking range of most snakes. A shaft 5 of about three feet in length has been found to be convenient and preferred. Likewise, the diameter of a cylindrical head 3 is sized to closely fit the hole of the vase canister which is usually about 4 inches in diameter. The height of the cylindrical head 3 from terminal edge 10 to top 4 is sized to accommodate the maximum expected accumulated debris or soil to be found in the canister hole, which is generally not in excess of 3 inches. It is also anticipated that several cylindrical heads 3 of varying diameters could also be supplied with a single shaft and be detachably affixed thereto to accommodate holes of varying diameters which may be encountered at a given location. Thus, it is readily understood that the device 1 of the present invention is relatively simple to use and inexpensive to construct and performs a heretofore difficult operation in a quick, safe and easy manner.

Having described the invention, what is claimed is:

1. A device for cleaning accumulated material from a blind hole comprising:
   a head portion having an open interior bounded by sidewalls and having an upper edge and a lower edge and rotatable about a longitudinal axis;
   a bottom plate affixed within the head portion and located a spaced distance from the lower edge thereof and aligned perpendicular to the longitudinal axis of the head portion, said bottom plate having a cutout section formed therein and cutting means formed along a side of said cutout section, said cutting means occupying the spaced distance betweem the bottom plate and the lower edge of the head portion; and
   shaft means for rotating the head portion about its longitudinal axis whereby said cutting means is adapted to dislodge the accumulated material within the blind hole and wherein continued rotation causes the dislodged material to pass through the cutout section to be retained within a storage reservoir defined by said bottom plate and the sidewalls of the head portion.

2. The hole cleaning device of claim 1 including barrier means affixed within the head portion to minimize spillage of said material retained within the storage reservoir through said cutout section.

3. The hole cleaning device of claim 2 wherein the barrier means comprises a vertical barrier plate affixed within the head portion, positioned along a side of the cutout section opposite the cutting means and extending transversly from the sidewall of the head portion to the shaft means and extending vertically from the bottom plate toward the upper terminal edge of the head portion.

4. The hole cleaning device of claim 1 wherein the bottom plate is spaced inwardly from the lower edge of the head portion and said cutting means extends downward from said plate and carries a cutting edge which terminates adjacent to a plane defined by said lower edge.

5. The hole cleaning device of claim 4 wherein the bottom plate includes an area adjacent to the cutout section on a side thereof opposite the cutting means which is curved upwardly from said plate to form an enlarged, entry region to permit the unobstructed passage of dislodged material into the storage reservoir.

6. The hole cleaning device of claim 5 wherein the head portion is cylindrical in shape and said cutout section of the bottom plate is a pie-shaped area, extending from the shaft means to the sidewall of the head portion and having an included angle defined by its converging sides of about 45°.

7. The hole cleaning device of claim 1 wherein the shaft means includes handle means to permit manual rotation thereof.

8. The hole cleaning device of claim 7 wherein the handle means comprises an elongated bar member attached at an end of said shaft means spaced from said head portion and transversly aligned relative to the axis of rotation of said shaft means.

9. A device for cleaning accumulated material from a blind hole comprising:
   a cylindrically-shaped head portion having an open interior bounded by sidewalls and having an upper edge and a lower edge and a longitudinal axis for concentric rotation thereabout;
   a circular plate member affixed within the head portion in spaced relation from the lower edge thereof, said plate member having a generally pie-shaped, cutout section formed therein and a cutting edge formed along a side of the cutout section said cutting edge downwardly depending from the plate member and terminating adjacent a plane defined by the lower edge of the head portion; and
   shaft means for rotating the head portion about its longitudinal axis whereby said cutting edge is adapted to dislodge accumulated material within the blind hole and wherein continued rotation causes the dislodged material to pass through the cutout section to be retained within a storage reservoir defined by said plate member and the sidewalls of the head portion.

10. The hole cleaning device of claim 9 wherein the plate member includes an upwardly curved area adjacent a side of the cutout section opposite the cutting edge to form an enlarged entry region communicating with said storage reservoir, whereby unobstructed entry of dislodged material into said storage reservoir is facilitated.

11. The hole cleaning device of claim 10 including barrier means affixed with the head portion to retain dislodged material within the storage reservoir.

12. The hole cleaning device of claim 11 wherein the barrier means comprises a vertical barrier plate affixed within the head portion along the side of the cutout portion opposite the cutting edge, extending transversly from the sidewall of the head portion to the shaft means and extending vertically from the plate member toward the upper edge of the head portion.

13. The hole cleaning device of claim 12 wherein the shaft means includes handle means to permit manual rotation thereof.

14. The hole cleaning device of claim 13 wherein the handle means comprises an elongated bar member attached at an end of said shaft means spaced from said head portion and transversly aligned relative to the axis of rotation of said shaft means.

15. A device for cleaning accumulated material from a blind hole comprising:

a head portion having an open interior bounded by sidewalls and having an upper edge and a lower edge and rotatable about a longitudinal axis;

a plate member affixed within the head portion in spaced relation from the lower edge thereof, said plate member having a cutout section and a cutting edge formed along a side of the cutout section, said cutting edge downwardly depending from the plate member and terminating adjacent a plane defined by the lower edge of the head portion, said plate member also having an upwardly curved area adjacent a side of the cutout section opposite the cutting edge to form an enlarged entry region communicating with the open interior of the head portion;

shaft means for rotating the head portion about its longitudinal axis; and barrier means affixed within the head portion along the side of the cutout section at the upwardly curved area, transversly extending from the sidewall of the head portion to the shaft means and vertically extending from the plate member to the upper edge of the head portion, wherein said barrier means, said plate member and said sidewalls form a storage reservoir adapted to retain dislodged material therein.

16. The holder cleaning device of claim 15 wherein the shaft means includes handle means to permit manual rotation thereof.

* * * * *